US008073095B2

(12) United States Patent
Hur et al.

(10) Patent No.: US 8,073,095 B2
(45) Date of Patent: Dec. 6, 2011

(54) LIQUID TARGET HAVING INTERNAL SUPPORT FOR RADIOISOTOPE PRODUCTION AT CYCLOTRON

(75) Inventors: Min Goo Hur, Daejeon (KR); Seung Dae Yang, Jeollabuk-do (KR); Sang Wook Kim, Daejeon (KR)

(73) Assignee: Korea Atomic Energy Research Institute, Daejeon (KR)

( * ) Notice: Subject to any disclaimer, the term of this patent is extended or adjusted under 35 U.S.C. 154(b) by 76 days.

(21) Appl. No.: 12/171,388

(22) Filed: Jul. 11, 2008

(65) Prior Publication Data

US 2009/0016478 A1 Jan. 15, 2009

(30) Foreign Application Priority Data

Jul. 11, 2007 (KR) ........................ 10-2007-0069545

(51) Int. Cl.
*G21G 1/10* (2006.01)
*G21G 1/00* (2006.01)
*B23P 19/00* (2006.01)

(52) U.S. Cl. ........ 376/202; 376/194; 376/195; 376/156; 29/723

(58) Field of Classification Search ...................... 29/723
See application file for complete search history.

(56) References Cited

U.S. PATENT DOCUMENTS 4,954,251 A * 9/1990 Barnes et al. ................. 210/806
5,586,153 A * 12/1996 Alvord .......................... 376/196
5,608,224 A * 3/1997 Alvord ..................... 250/442.11
5,917,874 A * 6/1999 Schlyer et al. ................ 376/194
6,359,952 B1 * 3/2002 Alvord .......................... 376/202
2006/0291607 A1 * 12/2006 Hong et al. .................. 376/168
2007/0153954 A1 * 7/2007 Harfensteller et al. ....... 376/194

FOREIGN PATENT DOCUMENTS

KR 10-0293690 4/2000
KR 10-0278585 1/2001

OTHER PUBLICATIONS

English Translation of Korean Patent Publication No. 10-2005-0053562 (Hong et al.).*
English Translation of Korean Patent Publication No. 10-2000-0025597 (Seung et al.).*

* cited by examiner

*Primary Examiner* — Rick Palabrica
*Assistant Examiner* — Erin M Leach
(74) *Attorney, Agent, or Firm* — Lucas & Mercanti, LLP

(57) ABSTRACT

An F-18 production target system having an internal support produces F-18 by means of a nuclear reaction of protons and $H_2^{18}O$, and reduces the deformation of thin sheets to thus increase the durability of the thin sheets. The F-18 production target system includes a frame, which has the shape of a cylinder the central portion of which is bored, holds $H_2^{18}O$ in the central portion, and includes through-holes bored from the central portion to the outer circumference thereof, thin sheets, which are installed on opposite sides of the frame so as to seal the central portion, and a support, which is installed in the central portion so as to prevent the thin sheets from being deformed.

6 Claims, 9 Drawing Sheets

LIQUID TARGET HAVING INTERNAL SUPPORT FOR RADIOISOTOPE PRODUCTION AT CYCLOTRON

BACKGROUND OF THE INVENTION

1. Field of the Invention

The present invention relates, in general, to an liquid radioisotope, e.g. F-18, production target having an internal support, which produces a radioisotope F-18 and, more particularly, to an F-18 production target having an internal support, in which the deformation of thin sheets, which occurs toward the center of an $H_2{}^{18}O$ holder, is reduced, thereby increasing the durability and the lifespan thereof.

2. Description of the Related Art

Generally, a target system for producing radioisotopes refers to a system that changes the state of matter of stable isotopes so as to receive high-energy protons accelerated at a cyclotron, to cause a nuclear reaction with stable isotopes, and to convert the stable isotopes into radioisotopes.

The target system for producing the radioisotopes is divided into three target systems: solid, liquid and gaseous, according to the state of matter of stable isotopes. Among them, the liquid and gas target systems are designed in a hermetic type in order to prevent the produced radioisotopes from leaking outside.

In particular, the liquid target system is widely used because it produces a great deal of isotopes via a nuclear reaction, and maintains a liquid phase, which is very advantageous in synthesizing various isotopic compounds. The radioisotopes produced using this target system are applied to the diagnosis of tumors or cancer.

Various methods of diagnosing tumors or cancer have been developed and used, such as X-ray computed tomography (CT), magnetic resonance imaging (MRI), single photon emission computed tomography (SPECT), positron emission tomography (PET), and so on.

Above all, the PET technology is technology for injecting a radioisotope or a labeled compound, emitting a positron, into a living body, and then imaging the distribution of the injected material in the body. The X-ray CT or the MRI images a structure in the human body to anatomically diagnose lesions, whereas the PET diagnoses abnormalities in the body using biochemical changes occurring prior to anatomical changes in the event of the onset of a disease.

Among radioactive medicaments used to obtain an image of the PET, one called 2-[$^{18}$F]fluoro-2-deoxy-D-glucose ([$^{18}$F]FDG) (hereinafter, referred to as "FDG") synthesizing fluorine (F) into glucose is widely used. A radioisotope, F-18, used for synthesizing FDG is produced by irradiating high-energy protons generated by the cyclotron onto $H_2{}^{18}O$ to thereby cause a nuclear reaction $^{18}O(p,n)^{18}F$.

In detail, as in FIG. 1, F-18 isotopes are produced by causing the nuclear reaction $^{18}O(p,n)^{18}F$ adopting O-18, an isotope of O-16, as a target material using the protons accelerated by the cyclotron. In other words, O-18, receiving the protons, emits neutrons, and is then converted into F-18.

F-18 is estimated to be the most ideal nuclide for use in the nuclear medical field because it decays by positron (β+) emission and has a half life of 110 minutes. Further, F-18 has a characteristic such that it is capable of obtaining a high resolution image because it has maximum positron energy of 511 keV and an average range of 2.4 mm in water.

Also, F-18 has a relatively long half life compared to other PET nuclides, so that it can have a long enough lifespan to synthesize the medicaments containing F-18, and so that it is appropriate to measure changes in distribution and concentration of these medicaments in a living body over time.

F-18 has a size similar to that of hydrogen, so that it does not greatly change the geometrical structure of a molecule (of another element). However, F-18 has much stronger electronegativity than hydrogen, and greatly increases lipophilicity, that is, affinity to fat, so that a great physical, biochemical change occurs in the molecule.

Part of the energy of each proton for this nuclear reaction $^{18}O(p,n)^{18}F$ is absorbed to a thin sheet, and is responsible for an increase in temperature of the thin sheet. The heated thin sheet is cooled using coolant or gas such as helium (He).

The target system for these radioisotopes is disclosed in Korean Patent Nos. 10-0293690 and 10-0278585. This conventional target system is illustrated in FIGS. 2 and 3.

As illustrated in FIGS. 2 and 3, the conventional target system 1 comprises a frame 10, which is formed with steps 14 in the front and rear inner circumferences thereof, flat faces 15 extending from the steps 14 in a radial inward direction, a predetermined space into which $H_2{}^{18}$ O, containing a stable isotope O-18, is introduced and held in a central portion 11 thereof, and through-holes 12 and 13 communicating with the central portion 11 such that $H_2{}^{18}O$ can flow in and out in a diagonal direction, and thin sheets 20, which are welded to the flat faces 15 of the frame 10 on opposite sides of the central portion 11 of the frame 10 such that $H_2{}^{18}$ O does not leak out of the front and rear of the central portion 11.

Further, in order to prevent $H_2{}^{18}$ O, held in the central portion 11, from leaking outside, ring-shaped seal members made of polyethylene (PE) may be selectively interposed between the thin sheets 20 and the frame 10.

In other words, the seal members 40 are compressed between the thin sheets 20 and the frame 10, so that they can prevent $H_2{}^{18}O$ from leaking to the outside.

The material held in the central portion 11 is $H_2{}^{18}O$, the mass of which is basically equal to that of water. The proton accelerated by the cyclotron is characterized in that energy is abruptly reduced depending on the density of material. Thus, the target system 1 for producing isotopes is designed using essential components so as to be able to maintain the energy of the proton unchanged.

For this reason, the metal thin sheet 20 is used at the front of the target system through which the proton accelerated by the cyclotron passes. The target system 1, developed in Korea, is adapted so that it employs these metal thin sheets 20 on opposite sides thereof so as to conduct smooth cooling.

This convention target system 1 is filled with $H_2{}^{18}O$ at the central portion 11 of the frame 10. In the case in which the protons are irradiated onto $H_2{}^{18}O$, the central portion 11 enters a high-pressure state due to heat generated by the nuclear reaction. At this time, the generated pressure is higher than the pressure of the coolant circulating around the thin sheets 20, and thus the thin sheets 20 are deformed in outward directions, as in FIG. 4A This deformation causes the level of the liquid in the central portion 11 to be lowered, so that the loss of the protons occurs.

In order to solve this problem, most research institutes or commercial companies make undertake research, so that separate grid structures are installed outside the respective thin sheets 20 so as to minimize the deformation of the thin sheets 20.

These grid structures are adapted to be installed outside the respective thin sheets 20 so as to prevent the thin sheets 20 from being deformed in outward directions. Each grid structure has a disc shape, and is provided with a plurality of through-holes in the central portion thereof such that the protons pass through the through-holes to be irradiated onto the central portion 11 of the frame 10.

However, although the aforementioned grid structures are installed, the thin sheets 20 are deformed inward toward the central portion 11 as in FIG. 4B due to the pressure of the external coolant in the process of recollecting the liquid after the protons are irradiated or in the state in which the central portion 11 is emptied.

Since the thin sheets 20 cause permanent deformation by means of external pressure or weak force, the magnitude of the permanent deformation is increased in proportion to the number of times that the target system 1 is used, so that the thin sheets 20 shrink.

Specifically, a small amount of $H_2{}^{18}O$ is loaded in the process of loading? O-18, and then the protons are irradiated. Thereby, the thin sheets 20 are deformed outwards due to heat and pressure, so that the level of $H_2{}^{18}O$ is lowered.

This result leads to problems of the loss of the protons occurring at the target system 1 before the grid structures are installed and of cooling insufficiency caused by a decrease in the cooling area. As this deformation is repeated, the magnitude of the deformation is increased. Ultimately, this acts as a main factor that reduces the life span of the target system 1 and the production yield of the isotopes.

SUMMARY OF THE INVENTION

Accordingly, the present invention has been made keeping in mind the above problems occurring in the related art, and an object of the present invention is directed to reduce the deformation of thin sheets of an F-18 production target system for producing F-18 to thus increase the durability of the thin sheets, increase the diameter of the central portion of a frame in which $H_2{}^{18}O$ is held to thus increase the cooling area of the thin sheets, and enable internal pressure of the frame to be maintained lower even when protons having the same energy are irradiated.

In order to achieve the above object, according to one aspect of the present invention, there is provided an F-18 production target having an internal support, which produces F-18 by means of a nuclear reaction between protons and $H_2{}^{18}O$. The F-18 production target system comprises: a frame, which has the shape of a cylinder a central portion of which is bored, holds $H_2{}^{18}O$ in the central portion, and includes through-holes bored from the central portion to the outer circumference thereof; thin sheets, which are installed on opposite sides of the frame so as to seal the central portion; and a support, which is installed in the central portion so as to inhibit the thin sheets from being deformed.

Here, the support may protrude from an inner wall toward the center of the central portion, and may have a T-shaped cross section.

Further, the support may be divided into two parts, which are symmetrical with respect to the through-holes, such that opposite ends thereof are spaced apart from the through-holes.

Also, the support may be made of niobium (Nb) or titanium (Ti).

Further, the frame may include steps sunken inwards on the opposite sides thereof, and flat faces extending from the steps. Further, the thin sheets may be fixed to the flat faces by welding.

Further, the frame and the thin sheets may be made of niobium (Nb) or titanium (Ti).

Meanwhile, the F-18 production target system may further comprise annular seal members interposed between the frame and the thin sheets. Here, the seal members may be made of polyethylene (PE).

In addition, the F-18 production target system may further comprise grid structures outside the thin sheets, wherein each grid structure has a disc shape and includes a plurality of through-holes.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
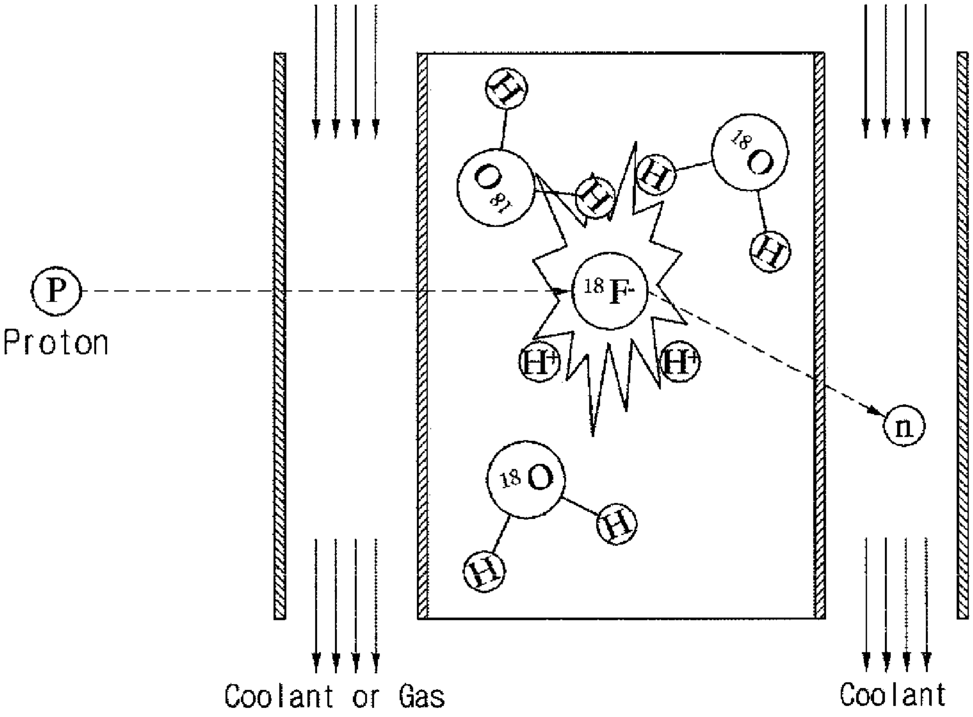
FIG. 1 is a schematic view illustrating the principle of irradiating protons accelerated by a cyclotron to produce F-18.
Figure 2:
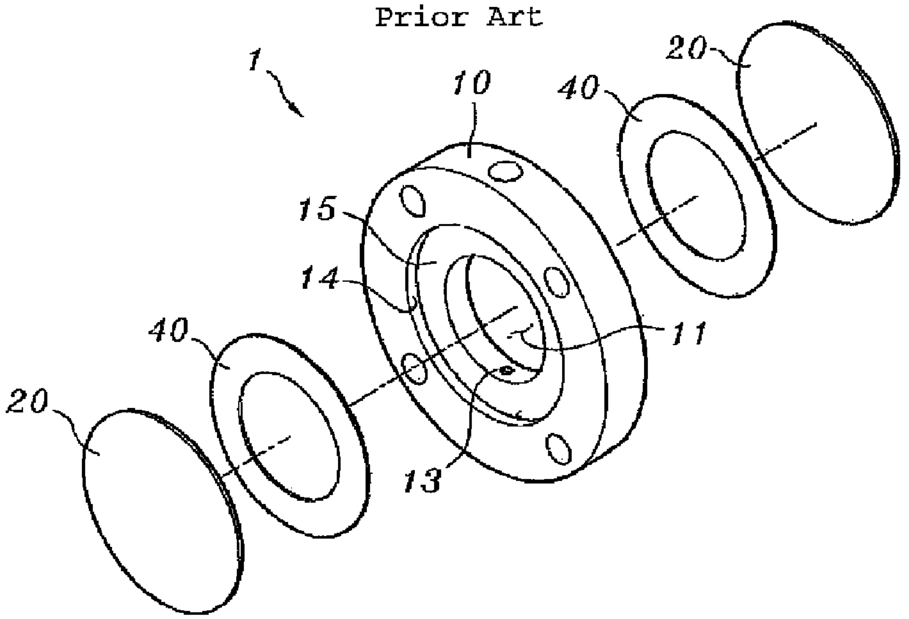
FIG. 2 Prior Art
FIG. 2 is a perspective view illustrating a conventional target system.
Figure 3:
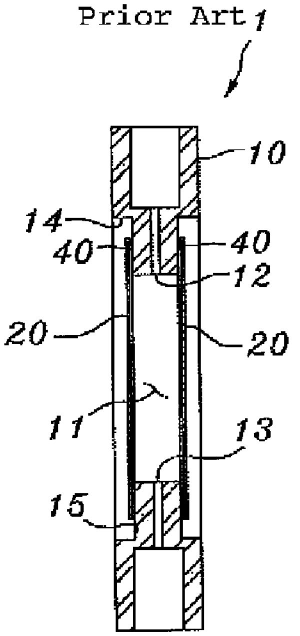
FIG. 3 Prior Art
FIG. 3 is a cross-sectional view illustrating a conventional target system.
Figure 4A:
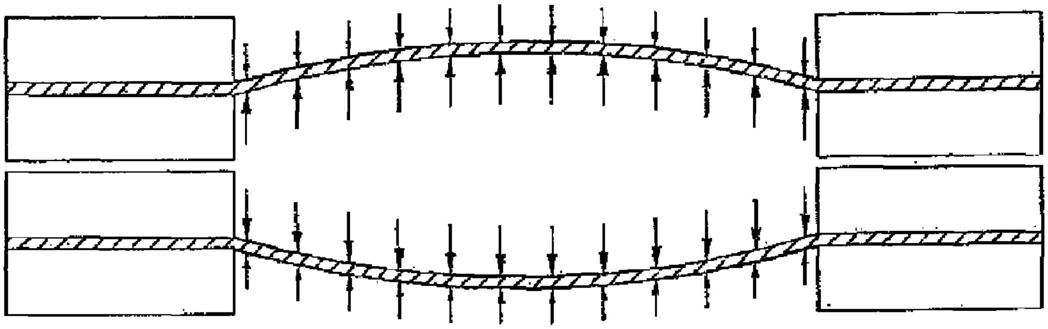
FIG. 4A Prior Art
FIG. 4 is a conceptual view illustrating force applied to thin sheets of a conventional target system.
Figure 4B:
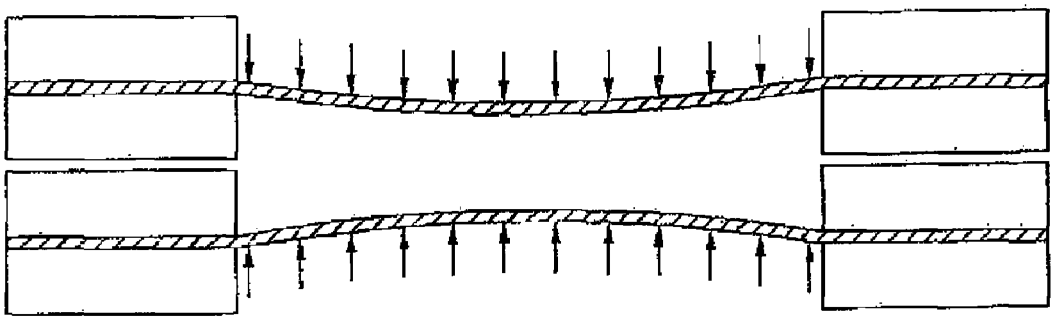
FIG. 4B Prior Art

Reference will now be made in greater detail to exemplary embodiments of the invention, an example of which is illustrated in the accompanying drawings. Wherever possible, the same reference numerals will be used throughout the drawings and the description to refer to the same or like parts.

Figure 5:
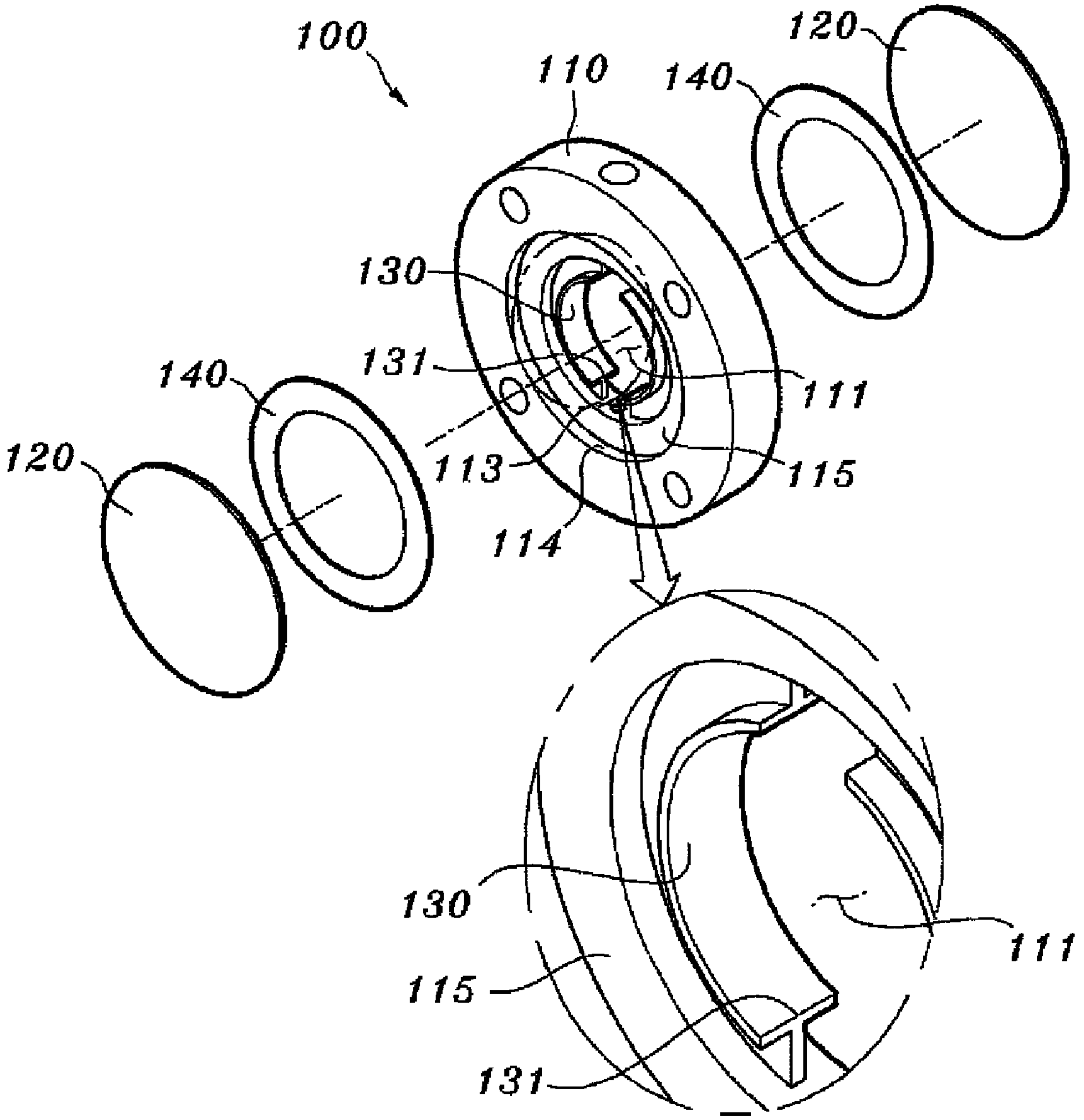
FIG. 5 is a perspective view illustrating a target system according to an exemplary embodiment of the present invention.
Figure 6:
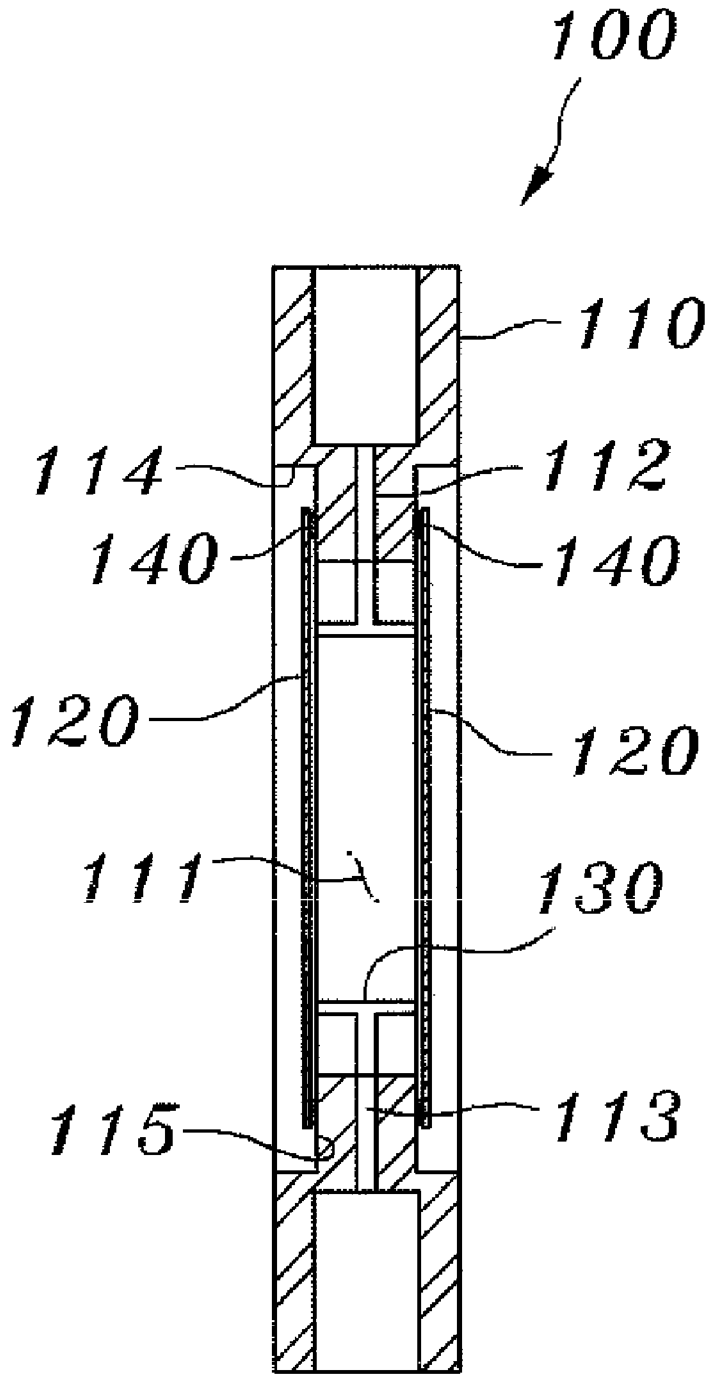
FIG. 6 is a cross-sectional view illustrating a target system according to an exemplary embodiment of the present invention.

FIG. 5 is a perspective view illustrating a target system according to an exemplary embodiment of the present invention. FIG. 6 is a cross-sectional view illustrating a target system according to an exemplary embodiment of the present invention.

As illustrated in FIGS. 5 and 6, the target system 100 of the present invention is directed to produce F-18 isotopes by causing a nuclear reaction $^{18}O(p,n)^{18}F$ adopting O-18, an isotope of O-16, as a target material using protons accelerated by a cyclotron.

The target system 100 of the present invention comprises a cylindrical frame 110, the central portion 111 of which is bored in order to produce F-18 using a nuclear reaction of protons and $H_2{}^{18}O$, thin sheets 120, which are installed on opposite sides of the frame 110 so as to seal the central portion 111, and a support 130, which is installed in the central portion 111 so as to prevent the thin sheets 120 from being deformed.

The frame 110 has the shape of a cylinder, the central portion 111 of which is bored, and is formed with steps 114 sunken inwards on the opposite sides thereof, flat faces 115 extending from the steps 114 in a radial inward direction, and through-holes 112 and 113 bored from the central portion 111 to the outer circumference thereof.

Further, the frame 110 is preferably made of lightweight, highly corrosion-resistant material such as niobium (Nb) or titanium (Ti).

The central portion 111 of the frame 110 holds contains $H_2{}^{18}O$, onto which protons can be irradiated to cause the nuclear reaction $^{18}O(p,n)^{18}F$ to thereby produce F-18.

Further, one 112 of the through-holes 112 and 113 of the frame 110 provides a passage, into which $H_2{}^{18}O$ is introduced for the nuclear reaction, whereas the other through-hole 113 provides a passage through which F-18, produced by the nuclear reaction $^{18}O(p,n)^{18}F$, is discharged.

Since $H_2{}^{18}O$ is provided in a liquid state, the central portion 111 of the frame 110 must be sealed such that $H_2{}^{18}O$ is held therein. To this end, the thin sheets 120 made of metal are coupled to the opposite sides of the central portion 111 of the frame 110.

In other words, the thin sheets 120 are fixed to the flat faces 115 of the frame 110 by electric welding, thereby sealing the central portion 111 of the frame 110.

These thin sheets 120 are preferably made of Nb or Ti about 75 μm thick such that the protons accelerated by a cyclotron can easily pass therethrough.

In detail, since each proton accelerated by the cyclotron has a characteristic such that the energy thereof is greatly reduced according to the thickness of a transmitted object, the thin sheets 120 are preferably made as thin as possible so that the energy of the proton can be maintained unchanged.

The thinner the thin sheets 120 become, the higher the energy of the transmitted proton becomes. However, the thin sheets 120 are repeatedly deformed by force, which is applied to the thin sheets 120 according to a change in pressure of the central portion 111 in which $H_2{}^{18}O$ is held.

At this time, each thin sheet 120 is preferably made of Nb or Ti, which are light and exhibit good heat resistance and corrosion resistance, such that the durability and the lifespan thereof are not reduced.

When the protons accelerated by the cyclotron are irradiated to cause nuclear reaction with $H_2{}^{18}O$ held in the central portion 111 of the frame 110, this produces F-18 and heat. Thus, it is necessary to appropriately cool the heat.

Thus, the central portion 111 of the frame 110, in which the nuclear reaction occurs, is prevented from being raised to a high temperature by circulating coolant or gas such as helium (He) along the thin sheets 120 at the outside of the thin sheets 120.

The support 130 is installed in the central portion 111, and preferably protrudes from an inner wall to the center of the central portion 111 in a T-shaped cross section.

More specifically, the support 130 has an extension protruding along the inner wall of the central portion 111 toward the center of the central portion 111, and a flange extending perpendicular to the extension so as to correspond to the width of the central portion 111. Thus, the support 130 has a T shape on the whole.

At this time, the support 130 is divided into two parts, which are symmetrical on the basis of a virtual line connecting the through-holes 112 and 113 such that the through-holes 112 and 113 of the frame 110 are not blocked. Thus, the opposite ends 131 of the supports 130 are spaced apart from the through-holes 112 and 113 at a predetermined interval.

In other words, the support 130 is divided into two parts, which are bilaterally symmetrical, adjacent to the through holes 112 and 113, so that the through-holes 112 and 113 are not blocked by the annular support 130. Thus, $H_2{}^{18}O$ is smoothly introduced through the through-hole 112, and F-18 produced by the nuclear reaction is smoothly discharged through the through-hole 113.

Further, like the frame 110 and the thin sheets 120, the support 130 is preferably made of Nb or Ti, which is light and exhibits good heat resistance and corrosion resistance.

In the target system of the present invention, when the protons accelerated by the cyclotron are irradiated, they cause the nuclear reaction with $H_2{}^{18}O$ held in the central portion 111 of the frame 110, and this nuclear reaction generates heat in the central portion 111 of the frame 110, and simultaneously increases the pressure in the central portion 111 of the frame 110.

Although the cooling medium, such as the coolant, is circulated around the thin sheets 120, the internal pressure of the central portion 111 of the frame 110 causes outward force to be applied to the thin sheets 120, so that the thin sheets 120 are subjected to deformation, expanding toward the outside of the central portion 111.

Further, in the case in which external pressure is applied to the inside of the central portion 111 in the process of recollecting the produced F-18 after the nuclear reaction is completed or in the state in which the central portion 111 of the frame 110 is emptied, the thin sheets 120 are subjected to deformation contracting toward the inside of the central portion 111.

At this time, since the thin sheets 120 are supported in the central portion 111 by the support 130, the deformation of the thin sheets 120 is reduced.

Figure 7A:
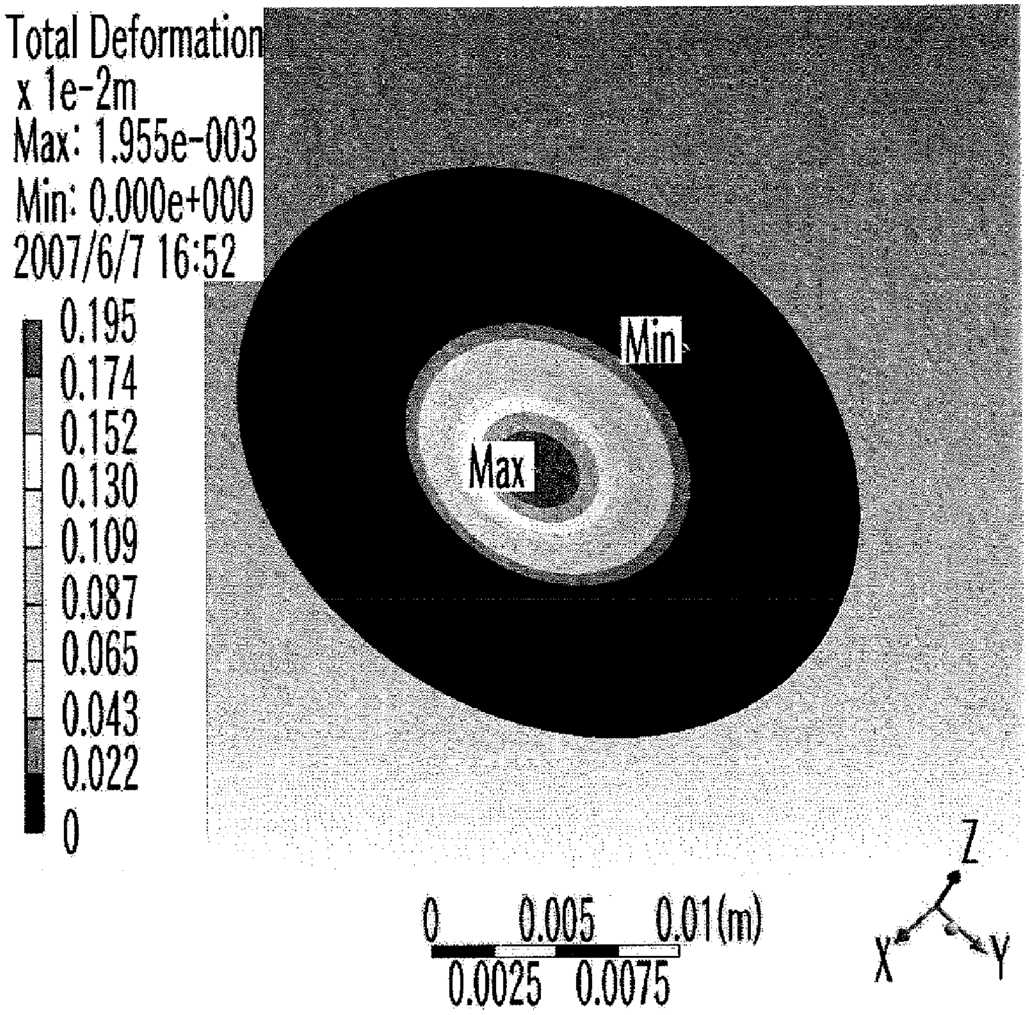
FIG. 7 illustrates the results of comparing the deformation of the thin sheet of a target system of the present invention with that of the prior art through a finite element method (FEM)
Figure 7B:
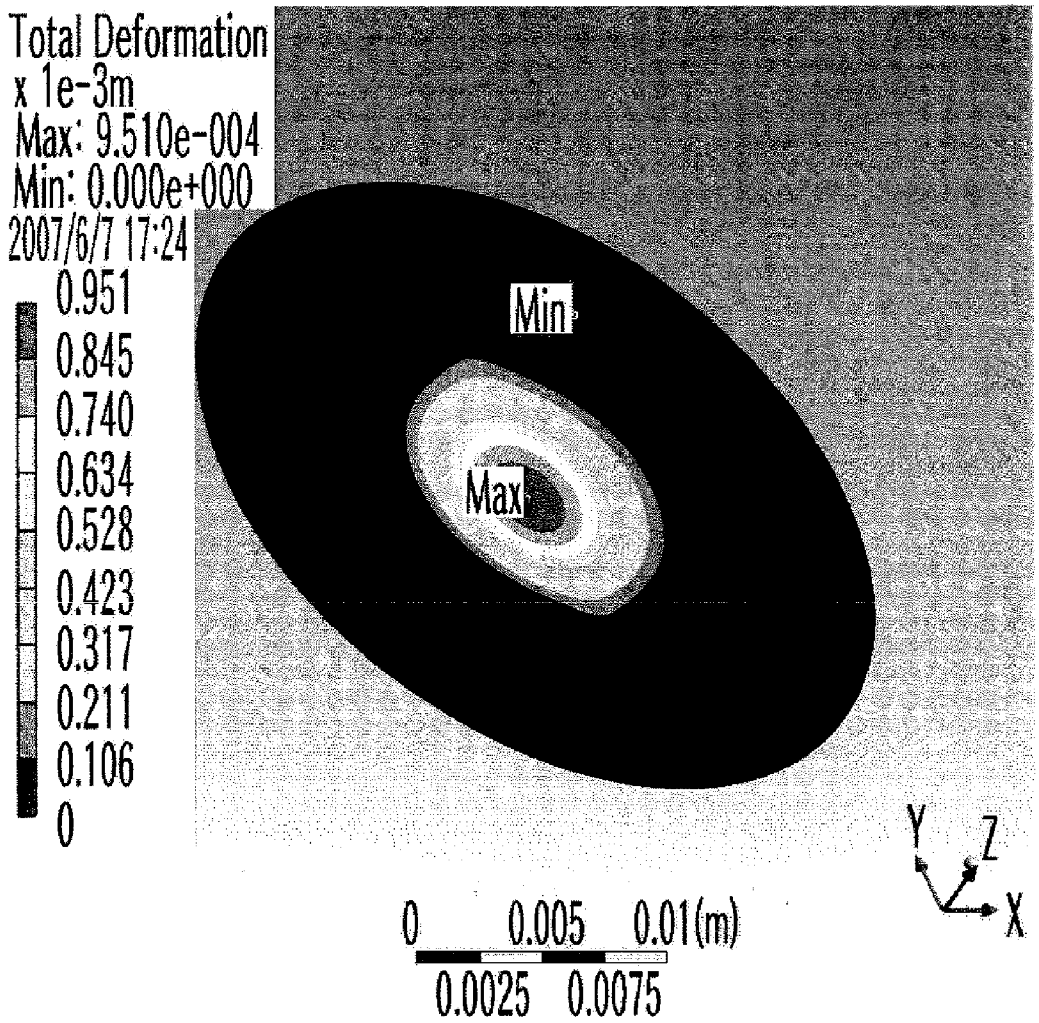

In conjunction with this deformation of the thin sheets 120, the target system of the present invention is compared with that of the prior art through a finite element method (FEM) as illustrated in FIG. 7, and the results thereof are as follows.

TABLE 1

| | Prior Art | Present Invention | Rate of Change (%) |
|---|---|---|---|
| Volume of Central Portion | 1.414 cc | 1.625 cc | +15% |
| Inner Diameter of Central Portion | 20 mm | 23 mm | +15% |
| Heat Transfer Area of Thin Sheet | 314 $mm^2$ | 385 $mm^2$ | +23% |
| Maximum Deformation of Thin Sheet | 1.95 mm | 0.95 mm | −51% |

As shown in FIG. 7 and Table 1, the maximum deformation of the thin sheet 120 of the conventional target system is 1.95 mm, whereas that of the thin sheet 120 of the inventive target system is 0.95 mm. Thus, it can be found that the latter is reduced by 51% compared to the former.

Figure 8:
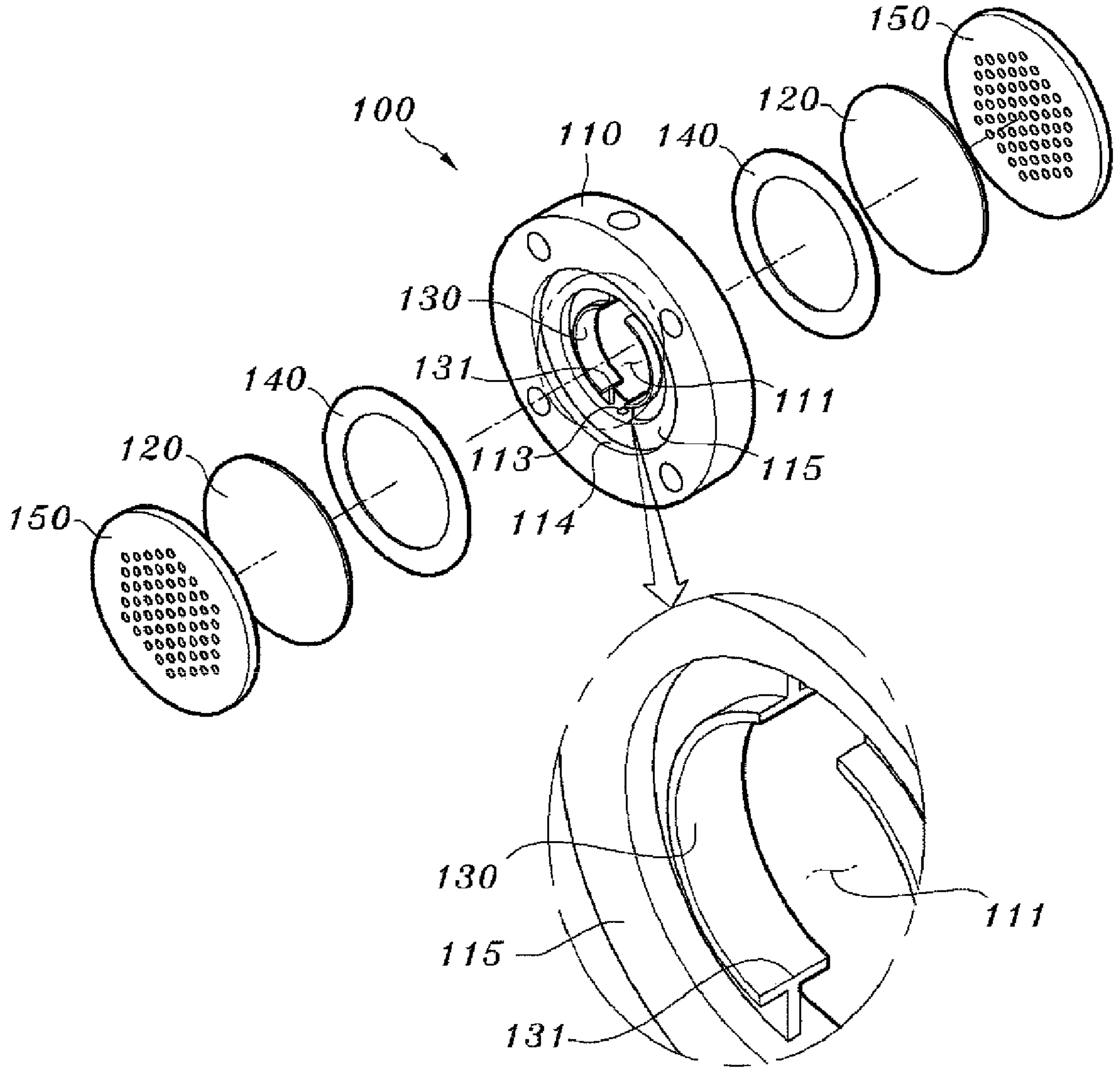
FIG. 8 is a perspective view illustrating a target system according to another exemplary embodiment of the present invention.
Figure 9:
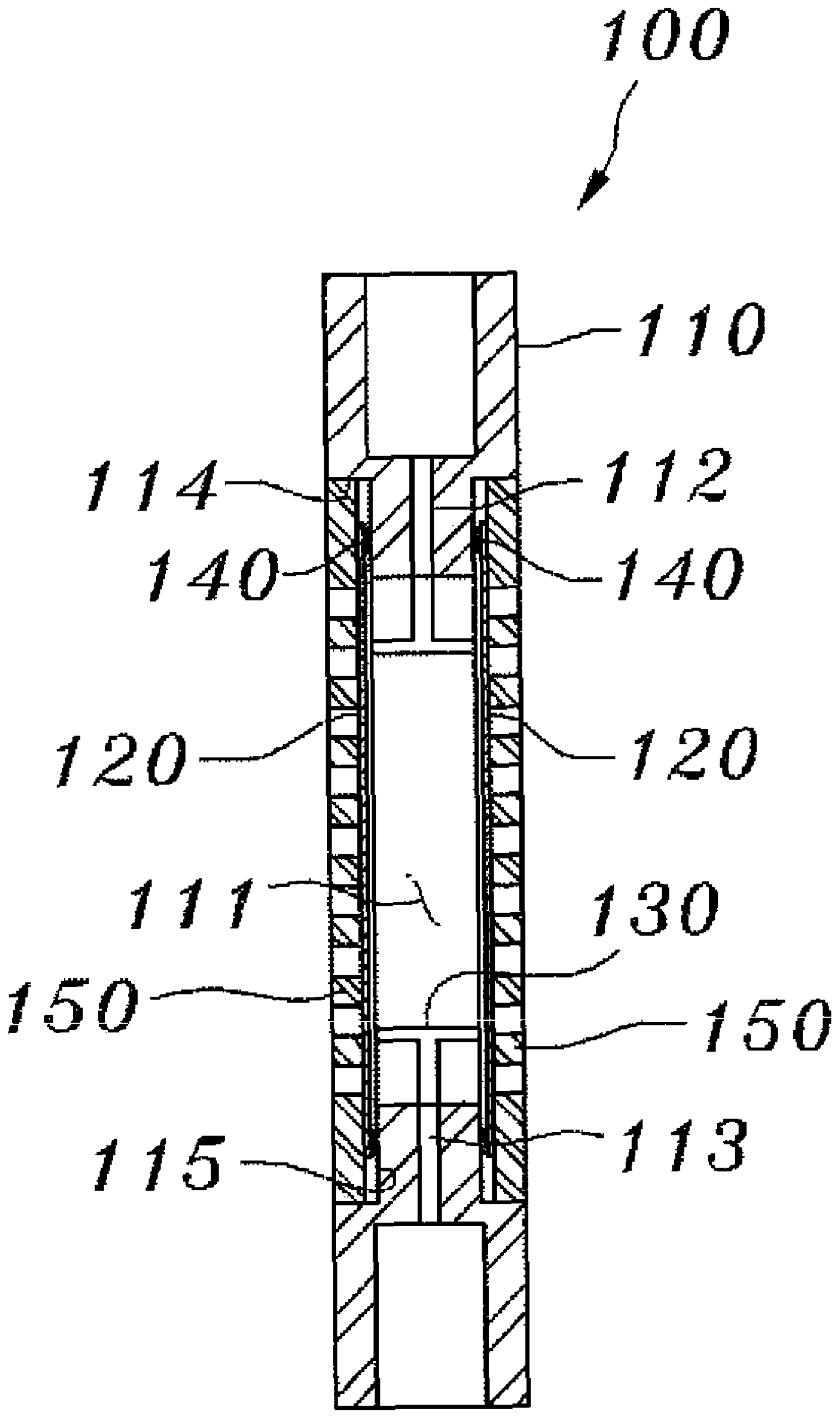
FIG. 9 is a cross-sectional view illustrating a target system according to another exemplary embodiment of the present invention.

Further, as another embodiment of the present invention, the target system, having a grid structure inhibiting the thin sheet from being deformed in an outward direction, is illustrated in FIGS. 8 and 9.

The frame 110, the thin sheets 120, and the support 130 have the same configuration as the aforementioned configuration, and so only additional components of the configuration will be described below.

Annular seal members 140 are interposed between the frame 110 and the thin sheets 120, and are made of polyethylene (PE).

The seal members 140 are compressed between the thin sheets 120 and the frame 110, so that they can prevent $H_2{}^{18}O$ held in the central portion 111 from leaking to the outside.

In the present invention, the material of each seal member 140 is limited to PE, but it may be selected from other various materials as long as it can form a seal between the thin sheets 120 and the frame 110.

Further, grid structures 150 having a plurality of holes are further installed outside the respective thin sheets 120. These grid structures 150 are adapted to be installed outside the respective thin sheets 120 so as to inhibit the thin sheets 120 from being deformed in outward directions. Each grid structure has a disc shape, and is provided with a plurality of holes in an almost entire surface thereof such that the protons pass through the holes to be irradiated onto the central portion 111 of the frame 110.

Thus, the thin sheets 120 can be prevented from being deformed in the outward directions through the grid structures 150 as well as in the inward directions through the support 130.

As is apparent from the above description, the target has the support having a T-shape cross section in the central portion of the frame in which $H_2{}^{18}O$ is held, so that it can inhibit the thin sheets, which are installed on the opposite sides of the central portion, from being deformed in the inward directions.

Moreover, the deformation of the thin sheets is reduced, so that the capacity of the central portion of the frame in which $H_2{}^{18}O$ is held can be increased. As the inner diameter of the central portion is increased, the cooling area performed by the cooling medium can be increased by the coolant circulating around the thin sheets.

This means that, although the protons having the same level of energy are irradiated, the target system can be maintained at relatively lower pressure. In other words, the protons, having a relatively higher level of energy, can be irradiated, and thus the productivity of F-18 can be increased.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A F-18 production target system, which produces F-18 by means of a nuclear reaction of protons and $H_2{}^{18}O$, the F-18 production target system, comprising:

a frame, which has a shape of a cylinder with a central portion of which is bored, holding the $H_2{}^{18}O$ in the central portion, and the frame includes through-holes bored from the central portion to an outer circumference thereof;

thin sheets, which are installed on opposite sides of the frame so as to seal the central portion;

an internal support, which is installed in the central portion so as to reduce the deformation of the thin sheets, and annular seal members which are made of polyethylene interposed between the frame and the thin sheets, wherein the internal support protrudes from an inner wall of the central portion toward a center of the central portion, the internal support has a T-shaped cross-section formed by an extension protruding along the inner wall of the central portion and a flange extending perpendicular to the extension, corresponding to a width of the central portion, and the internal support is divided into two parts, which are symmetrical with respect to the through-holes such that opposite ends thereof are spaced apart from the through-holes, wherein the entire internal support is disposed between the thin sheets, the internal support and the frame are made of niobium or titanium, the thin sheets are cooled by circulating helium (He) along the thin sheets at the outside of the thin sheets, and thin sheets are made of niobium or titanium which is 75 μm thick such that the protons accelerated by a cyclotron can easily pass therethrough.

2. The F-18 production target system as set forth in claim 1, wherein the frame includes steps sunken inwards on the opposite sides thereof, and flat faces extending from the steps.

3. The F-18 production target system as set forth in claim 2, wherein the thin sheets are fixed to the flat faces by welding.

4. A F-18 production target system, comprising:

a frame, which has a shape of a cylinder with a central portion of which is bored, holding the $H_2{}^{18}O$ in the central portion, and includes through-holes bored from the central portion to an outer circumference thereof;

thin sheets, which are installed on opposite sides of the frame so as to seal the central portion;

an internal support, which is installed in the central portion so as to reduce the deformation of the thin sheets;

annular seal members which are made of polyethylene interposed between the frame and the thin sheets; and grid structures outside the thin sheets, wherein each grid structure has a disc shape and includes a plurality of holes;

the thin sheets are cooled by circulating helium (He) along the thin sheets at the outside of the thin sheets, and thin sheets are made of niobium or titanium which is 75 μm thick such that the protons accelerated by a cyclotron can easily pass therethrough; and the internal support protrudes from an inner wall of the central portion toward a center of the central portion, wherein the entire internal support is disposed between the thin sheets, and the internal support has a T-shaped cross-section formed by an extension protruding along the inner wall of the central portion and a flange extending perpendicular to the extension, corresponding to a width of the central portion, and the internal support is divided into two parts, which are symmetrical with respect to the through-holes such that opposite ends thereof are spaced apart from the through-holes.

5. The F-18 production target system as set forth in claim 4, wherein the frame includes steps sunken inwards on the opposite sides thereof, and flat faces extending from the steps.

6. The F-18 production target system as set forth in claim 5, wherein the thin sheets are fixed to the flat faces by welding.

* * * * *